United States Patent
Pehlke

(10) Patent No.: US 12,506,498 B2
(45) Date of Patent: Dec. 23, 2025

(54) FAST SRS ANTENNA PORT SWITCHING FOR FREQUENCY-DIVISION DUPLEXING

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

(*) Notice: Subject to any disclaimer, the term of this patent is extended or adjusted under 35 U.S.C. 154(b) by 0 days.

(21) Appl. No.: 18/435,827

(22) Filed: Feb. 7, 2024

(65) Prior Publication Data

US 2024/0305315 A1 Sep. 12, 2024

Related U.S. Application Data

(63) Continuation of application No. 17/579,495, filed on Jan. 19, 2022, now Pat. No. 12,081,244.

(60) Provisional application No. 63/139,393, filed on Jan. 20, 2021.

(51) Int. Cl.
*H04B 1/00* (2006.01)
*H04B 1/50* (2006.01)
*H04L 5/14* (2006.01)

(52) U.S. Cl.
CPC ............. *H04B 1/0057* (2013.01); *H04B 1/50* (2013.01); *H04L 5/1461* (2013.01)

(58) Field of Classification Search
CPC ....... H04B 1/0057; H04B 1/50; H04L 5/1461; H04L 5/0005; H04L 5/0007; H04L 5/0048; H04L 5/14
USPC .......................................................... 370/280
See application file for complete search history.

(56) References Cited

U.S. PATENT DOCUMENTS

| | | |
|---|---|---|
| 11,245,552 B2 | 2/2022 | Brunel et al. |
| 11,601,247 B2 | 3/2023 | Brunel et al. |
| 12,081,244 B2 | 9/2024 | Pehlke |
| 2018/0205530 A1 | 7/2018 | Pehlke |
| 2018/0368078 A1* | 12/2018 | Vintola ................. H04L 5/0048 |
| 2019/0158332 A1 | 5/2019 | Akkarakaran et al. |
| 2020/0220256 A1* | 7/2020 | Cetinoneri ............... H01Q 1/38 |
| 2022/0231710 A1 | 7/2022 | Pehlke |
| 2022/0407571 A1 | 12/2022 | Drogi et al. |
| 2023/0163728 A1 | 5/2023 | Jain et al. |
| 2023/0163918 A1 | 5/2023 | Brunel et al. |

* cited by examiner

*Primary Examiner* — Nizam U Ahmed
(74) *Attorney, Agent, or Firm* — Knobbe, Martens, Olson & Bear, LLP

(57) ABSTRACT

Methods and systems for fast sounding reference symbol (SRS) antenna port switching for FDD. A mobile device can include a baseband processor and a front end including a transmit power amplifier, a first transmit path, and a second transmit path. The front end can be configurable in a first mode to transmit via the first transmit path within a transmit band of a frequency division duplex band. The front end can be further configurable in a second mode to transmit via the second transmit path within a receive band of the frequency division duplex band.

19 Claims, 16 Drawing Sheets

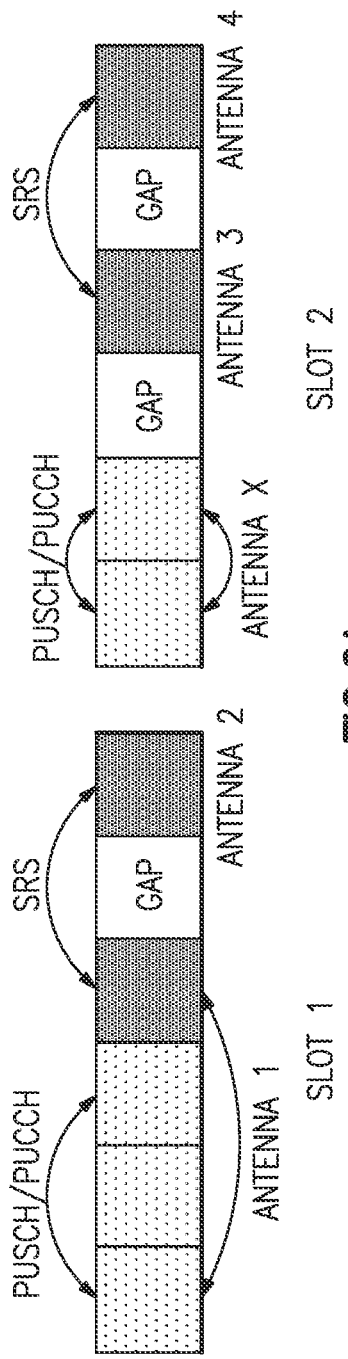

| NUMEROLOGY [μ] | 0 | 1 | 2 | 3 | 4 |
|---|---|---|---|---|---|
| SUBCARRIER SPACING [kHz] | 15 | 30 | 60 | 120 | 240 |
| NUMBER OF SLOTS / SUBFRAME | 1 | 2 | 4 | 8 | 16 |
| OFDM SYMBOL DURATION (1:13)[μs] | 66.67 | 33.33 | 16.67 | 8.33 | 4.17 |
| CYCLIC PREFIX DURATION (1:13)[μs] | 4.69 | 2.34 | 1.17 | 0.57 | 0.29 |
| OFDM SYMBOL INCLUDING CP(1:13)[μs] | 71.35 | 35.68 | 17.84 | 8.92 | 4.46 |
| MINIMUM SCHEDULING INTERVAL[μs] | 1000 | 500 | 250 | 125 | 62.5 |
| SCHEDULING INTERVAL FOR MINI SLOT LENGTH 2 OS[μs] | 142 | 71 | 36 | 18 | 9 |

FAST SRS ANTENNA PORT SWITCHING FOR FREQUENCY-DIVISION DUPLEXING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 450 MHz to about 7 GHz for certain communications standards. MIMO communications use multiple antennas for simultaneously communicating multiple data streams over common frequency spectrum. MIMO communications can benefit from higher SNR, improved coding, and/or reduced signal interference due to spatial multiplexing differences of the radio environment.

Examples of RF communication systems include, but are not limited to, mobile phones, tablets, base stations, network access points, customer-premises equipment (CPE), laptops, and wearable electronics.

SUMMARY

A mobile device according to certain aspects includes a baseband processor and a front end including a transmit power amplifier, a first transmit path, and a second transmit path. The front end can be configurable in a first mode to transmit via the first transmit path within a transmit band of a frequency division duplex band. The front end can be further configurable in a second mode to transmit via the second transmit path within a receive band of the frequency division duplex band.

The first mode can be a frequency division duplex communication mode in which the front end also receives within a receive band of the frequency division duplex band. In the second mode the baseband processor can generate a first sequence of symbols for transmission within the receive band via the second transmit path. The first sequence can include one or more sounding reference signal symbols.

The front end can include a frequency division duplex filter having a transmit portion configured to pass signals within the transmit band and a receive portion configured to pass signals within the receive band. The transmit portion can be positioned within the first transmit path. The front end can include a second filter positioned within the second transmit path configured to pass signals within at least the receive band of the frequency division duplex band. The second filter can be configured to pass signals within a time division duplex band that encompasses the receive band of the frequency division duplex band.

The front end can also include an antenna switch configured to switch between connecting an output of the frequency division duplex filter to an antenna of the mobile and connecting the output of the second filter to the antenna.

The front end can include a frequency division duplex filter including a first portion configured to pass signals within the transmit band and a second portion configured to pass signals within the receive band. The first portion can be positioned within the first transmit path and the second portion positioned within the second transmit path. The receive portion can be positioned within both the second transmit path and a frequency division duplex receive path. The first mode can be a frequency duplex communication mode, the receive portion can receive when the front end operates in the first mode, and the receive portion can transmit when the front end operates in the second mode, in which the front end may transmit one or more sounding reference signal symbols.

According to additional aspects of the disclosure, a radio frequency module includes a substrate, a power amplifier supported by the substrate, a first transmit path, and a second transmit path. The radio frequency module can be configurable in a first mode to transmit, via the first transmit path, within a transmit band of a frequency division duplex band. The radio frequency module can be further configurable in a second mode to transmit, via the second transmit path, within a receive band of the frequency division duplex band.

The first mode can be a frequency division duplex communication mode in which the radio frequency module also receives within a receive band of the frequency division duplex band. In the second mode, the second transmit path can transmit a first sequence of symbols for transmission within the receive band, where the first sequence includes one or more sounding reference signal symbols.

The module can include a frequency division duplex filter having a transmit portion configured to pass signals within the transmit band and a receive portion configured to pass signals within the receive band. The transmit portion can be positioned within the first transmit path.

The module can include a second filter positioned within the second transmit path and configured to pass signals within a frequency band that includes at least the receive band of the frequency division duplex band. The module can include a frequency division duplex filter including a first portion configured to pass signals within the transmit band and a second portion configured to pass signals within the receive band. The first portion can be positioned within the first transmit path and the second portion can be positioned within the second transmit path.

According to yet further aspects, a method of operating a mobile device is provided. The method can include causing the mobile device to enter a first operating mode in which the mobile device transmits, via a first transmit path of the mobile device, within a transmit band of a frequency division duplex band, and in which the mobile device receives, via a receive path of the mobile device, within a receive band of the frequency division duplex band. The method can additionally include causing the mobile device to enter a second operating mode in which the mobile device transmits, via a second transmit path of the mobile device, within the receive band of the frequency division duplex band. The method can additionally include, when the mobile device is in the second operating mode, transmitting one or more sounding reference symbols to a base station via the second transmit path. The first transmit path can extend between a transmit power amplifier of the mobile device and an antenna of the mobile device. The second transmit path can extend between the power amplifier of the mobile device and the antenna of the mobile device via a different connection pathway. The first transmit path can includes a filter with a pass band about as wide as the receive band of the frequency division duplex band and the second transmit path can include a filter with a passband that encompasses and is substantially wider than the receive band of the frequency division duplex band. In some embodiments, in the first operating mode a first filter of the mobile device is within the receive path, and in the second operating mode, the first filter is within the second transmit path.

BRIEF DESCRIPTION OF THE DRAWINGS

FIG. 6A is a diagram depicting two examples of symbol blanking for time slots including sounding reference signal (SRS) symbols.

FIG. 6B is a table depicting one example of symbol duration versus subcarrier spacing (SCS).

DETAILED DESCRIPTION OF EMBODIMENTS

Figure 1:
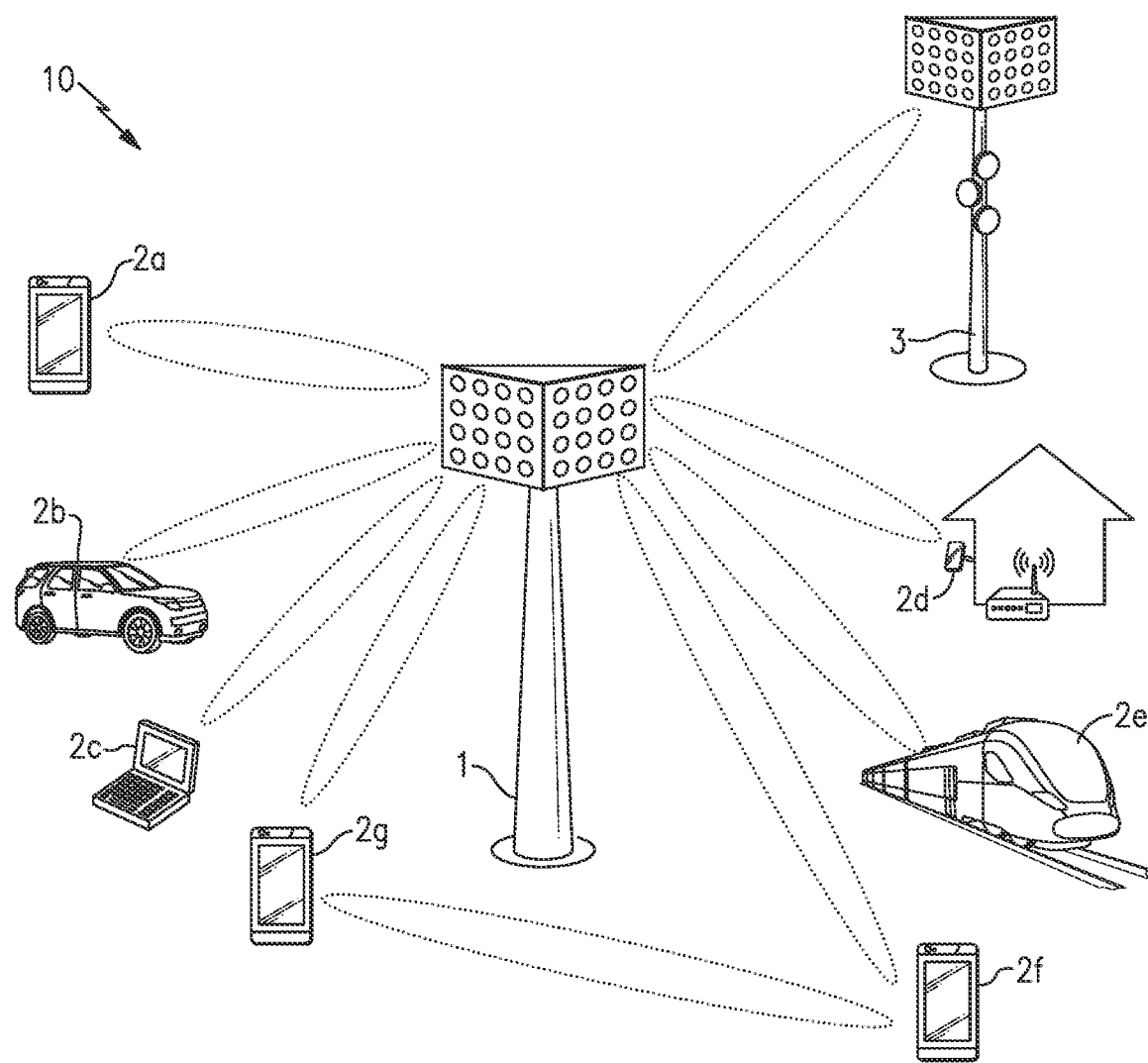
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IoT), Vehicle-to-Everything (V2X), and High-Power User Equipment (HPUE).

3GPP introduced Phase 1 of fifth generation (5G) technology in Release 15 and plans to introduce Phase 2 of 5G technology in Release 16 (targeted for 2019). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

A sounding reference signal (SRS) is a reference signal transmitted by the UE in the uplink direction which is used by the eNodeB to estimate the uplink channel quality over different frequencies. Fast SRS hopping (antenna port switching or fast SRS antenna port switching) is a feature to enhance signal-to-noise ratios for down-link multi-input and multi-output (MIMO) communications by enabling a better transfer function to be developed at the base station for each downlink antenna in the user equipment that the sequence of known symbols is transmitted on. In other words, antenna port switching allows a calibration sequence to be performed for the downlink antennas of a particular UE.

For example, known symbols (reference signals) are transmitted in a specific known order from each of four down-link antennas: Symbol_1 from Antenna_1, Symbol_2 from Antenna_2, Symbol_3 from Antenna_3, and Symbol_4 from Antenna_4. The base station receives the known reference signal transmitted from each down-link antenna. The base station, knowing the particular reference signal that was sent, determines an accurate mathematical model of the radio channel, multi-path, and RF environment for each down-link antenna in the user equipment. That is, these known transmissions allow the base station (gNodeB) to calculate a much more accurate model of the radio channel for a particular downlink antenna on a particular UE. Subsequently, when the base station has downlink sub-frames to be transmitted to particular user equipment, the gNodeB leverages the new information it received during this calibration sequence to improve the downlink signal-to-noise ratio for 4×4 and higher order MIMO, for example, up to 1.5 dB to 2 dB. One fundamental aspect of this technique is that the UL Tx of the known symbols should be done at the same frequency as the DL channel to build the most accurate transfer function and RF model. For FDD bands that have duplex space in an offsetting frequency between UL and DL, the difference in DL channel model from the different frequency of the UL may decrease the overall benefit of this technique. DL MIMO on the same channel in TDD can optimize SNR and multi-path coherence. The problem is for Frequency Division Duplexing (FDD) where the uplink (UL) and DL are not at the same frequency as in Time Division Duplexing (TDD). Embodiments that leverage the ability to transmit at the same frequency as is used for receiving transmissions can facilitate fast SRS for FDD.

To address this problem, disclosed embodiments can transmit the Tx reference symbols on the Rx frequency and can use the Rx antennas for such transmissions. Functionality relating to transmitting Tx reference symbols on an Rx frequency and using the Rx antennas for transmitting the Tx reference symbols can be implemented in various embodiments. For example, such embodiments an include:

(1) leveraging TDD bands already connector-ized for Tx in the Rx frequencies of a subset FDD Rx band. For example, LTE Band 41 can transmit the known symbols at the Rx channel frequency for B7, so UE already configured for both B7 and B41 can deliver UL of specific known symbols at the Rx frequency for that case. Another example, uses B40 to transmit in B30 Rx frequencies; or (2) configuring the UE Rx path for a more power-capable filter that can manage transmit power levels, and to connectorize that filter for a path from the power amplifier (PA).

In some implementations, these types of architectures may be widespread as they can be used in user equipment designed to communicate directly between user equipment. In another aspect, the gNodeB must also receive known reference signals at the Rx frequencies and must be similarly equipped to receive signals on Rx, which may or may not be typical for an FDD-only gNodeB—other changes may be required at the base station side, and it would have to schedule all coexistence-limited co-located UEs to synchronously transmit SRS sequences together at the same time so that Tx to Rx interference doesn't occur.

ACRONYMS/TERMS

1T4R: one transmit four receive
2T4R: two transmit four receive
3G: third generation technology
3GPP: Third Generation Partnership Project
4G: fourth generation technology
5G: fifth generation technology
CCSA: China Communications Standards Association
CDMA: code division multiple access
DL: downlink
EDGE: enhanced data rates for GSM evolution
eLAA: enhanced license assisted access
eMBB: enhanced mobile broadband
eNodeB: Evolved Node B
FDD: frequency division duplexing
FDMA: frequency division multiple access
FR1: frequency range 1
FR2: frequency range 1
gNodeB: base station
GSM: global system for mobile communications
HPUE: high power user equipment
HSPA: high speed packet access
IoT: Internet of things
ITU: International Telecommunication Union
LAA: license assisted access
LTE: long term evolution
LNA: low noise amplifier
mMTC: massive machine-type communications
MIMO: multi-input and multi-output
NB-IoT: Narrowband Internet of things
NOMA: non-orthogonal multiple access
NR: 5G new radio
OFDMA: orthogonal frequency division multiple access.
PA: power amplifier
PCC: primary component carrier
PAE: power added efficiency
PUCCH: physical uplink control channel
PUSCH: physical uplink shared channel
RF: radio frequency
SCCs: secondary component carriers
SCS: subcarrier spacing
SD-FDMA: single carrier frequency division multiple access
SDMA: space-divisional multiple access
SRS: sound referencing signal
TDD: time division duplexing
TDMA: time division multiple access
UE: user equipment
UL: uplink
UCI: uplink control information.

UMTS: Universal Mobile Telecommunications System
UN: United Nations
uRLLC: ultra-reliable low latency communications
V2X: vehicle-to-everything
WLAN: wireless local area network.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHZ.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
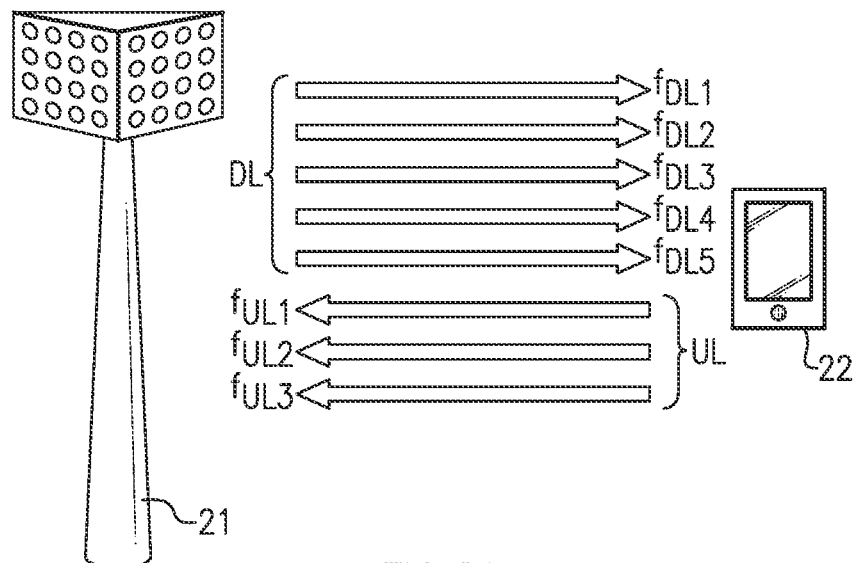
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
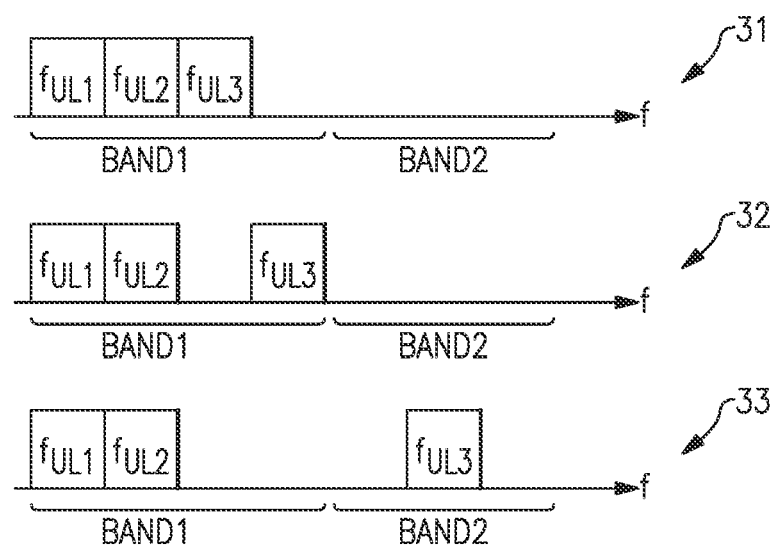
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
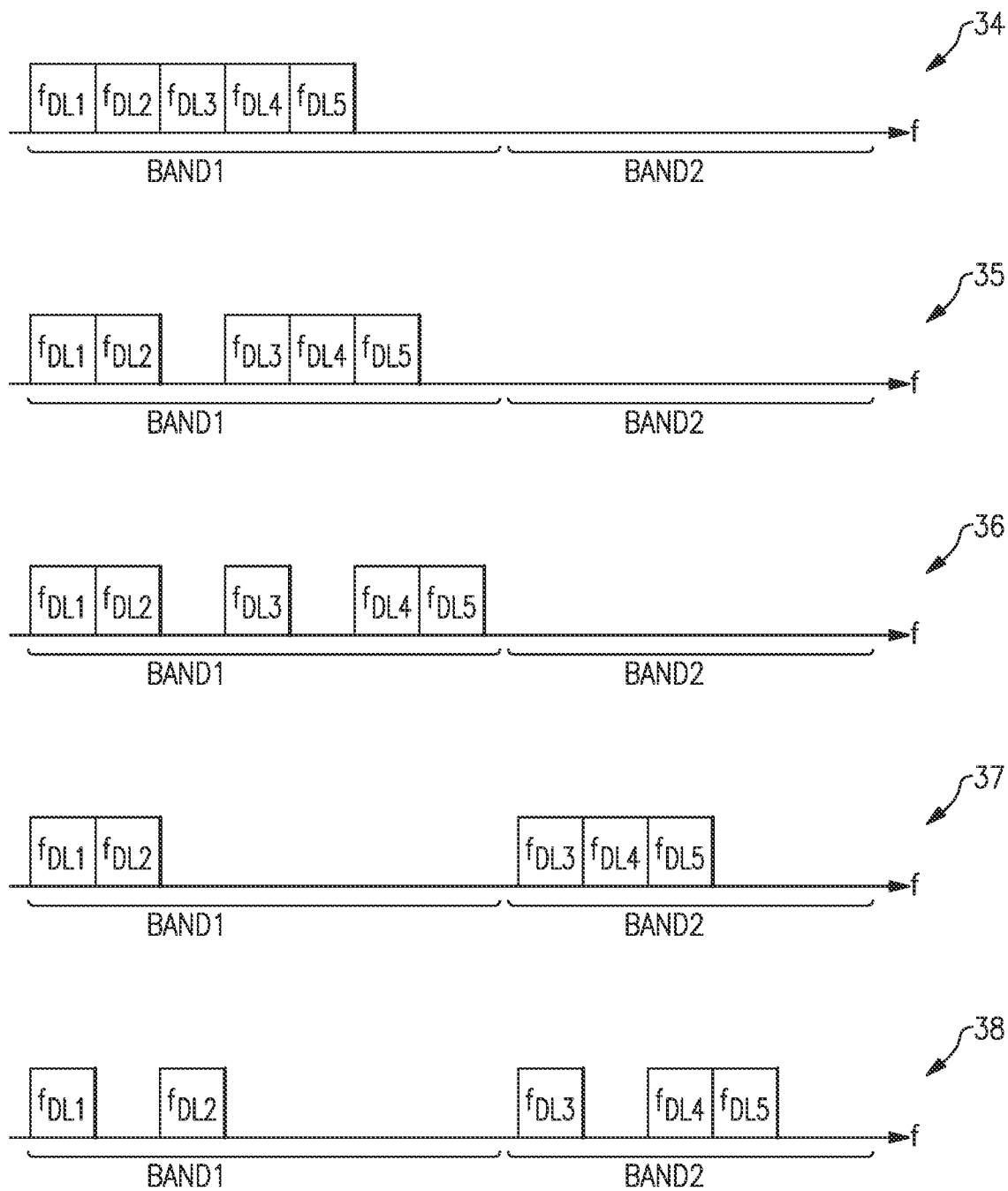
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
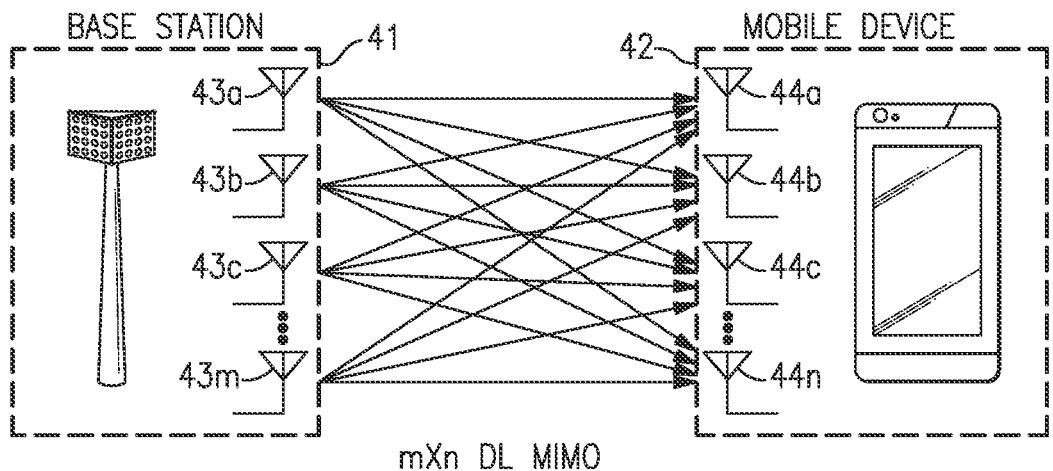
FIG. 3A is a schematic diagram of one example of a downlink channel using multi-input and multi-output (MIMO) communications.
Figure 3B:
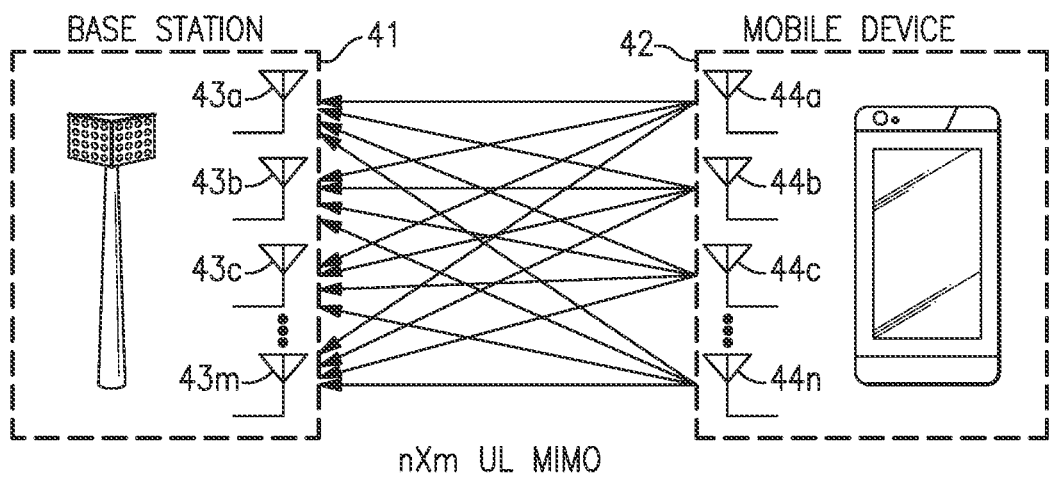
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas $43a$, $43b$, $43c$, . . . $43m$ of the base station 41 and receiving using N antennas $44a$, $44b$, $44c$, . . . $44n$ of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas $44a$, $44b$, $44c$, . . . $44n$ of the mobile device 42 and receiving using M antennas $43a$, $43b$, $43c$, . . . $43m$ of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
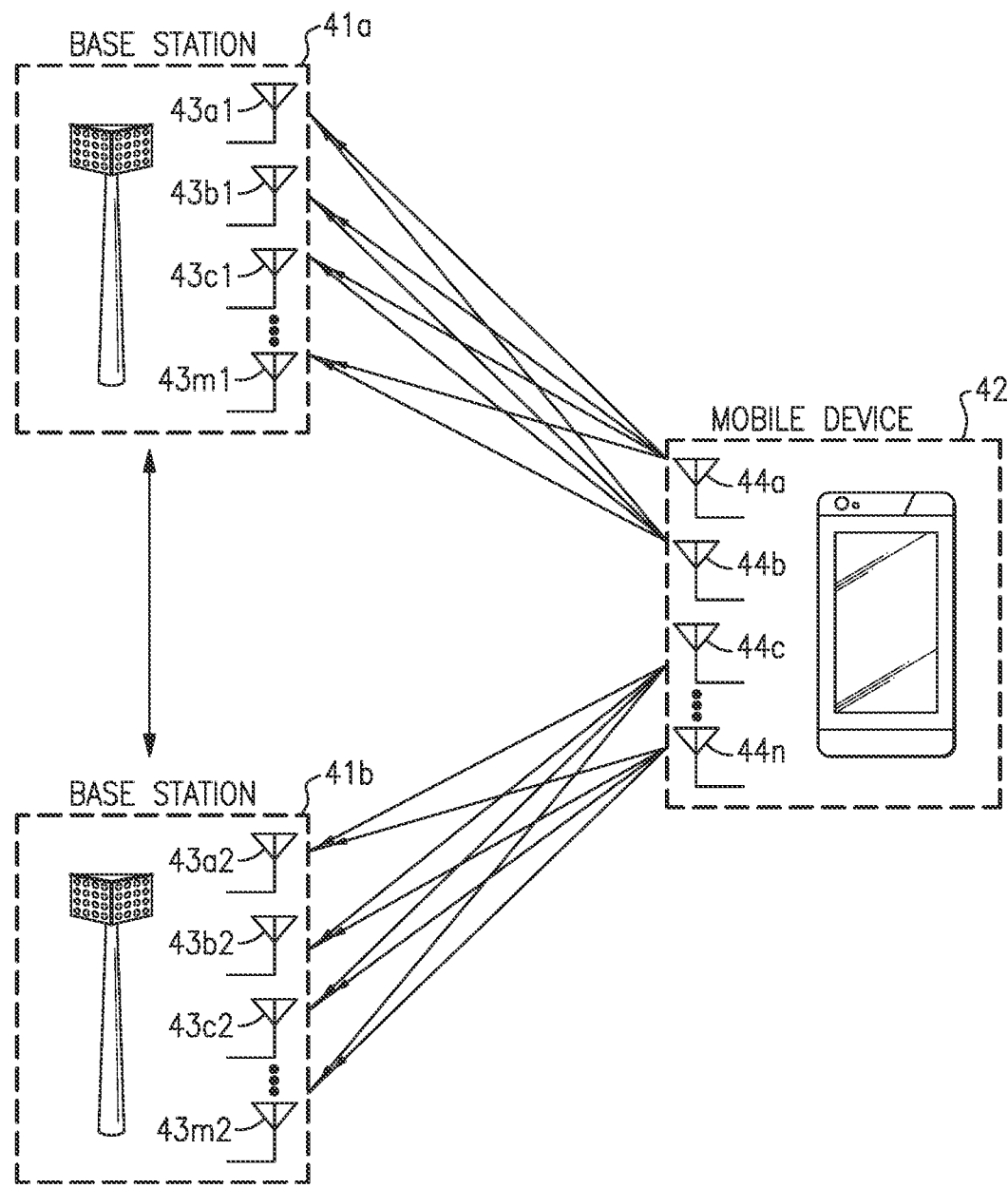
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas $44a$, $44b$, $44c$, . . . $44n$ of the mobile device 42. Additionally, a first portion of the uplink transmissions are received using M antennas $43a1$, $43b1$, $43c1$, . . . $43m1$ of a first base station $41a$, while a second portion of the uplink transmissions are received using M antennas $43a2$, $43b2$, $43c2$, . . . $43m2$ of a second base station $41b$. Additionally, the first base station $41a$ and the second base station $41b$ communication with one another over wired, optical, and/or wireless links.

The MIMO scenario of FIG. 3C illustrates an example in which multiple base stations cooperate to facilitate MIMO communications.

Figure 4:
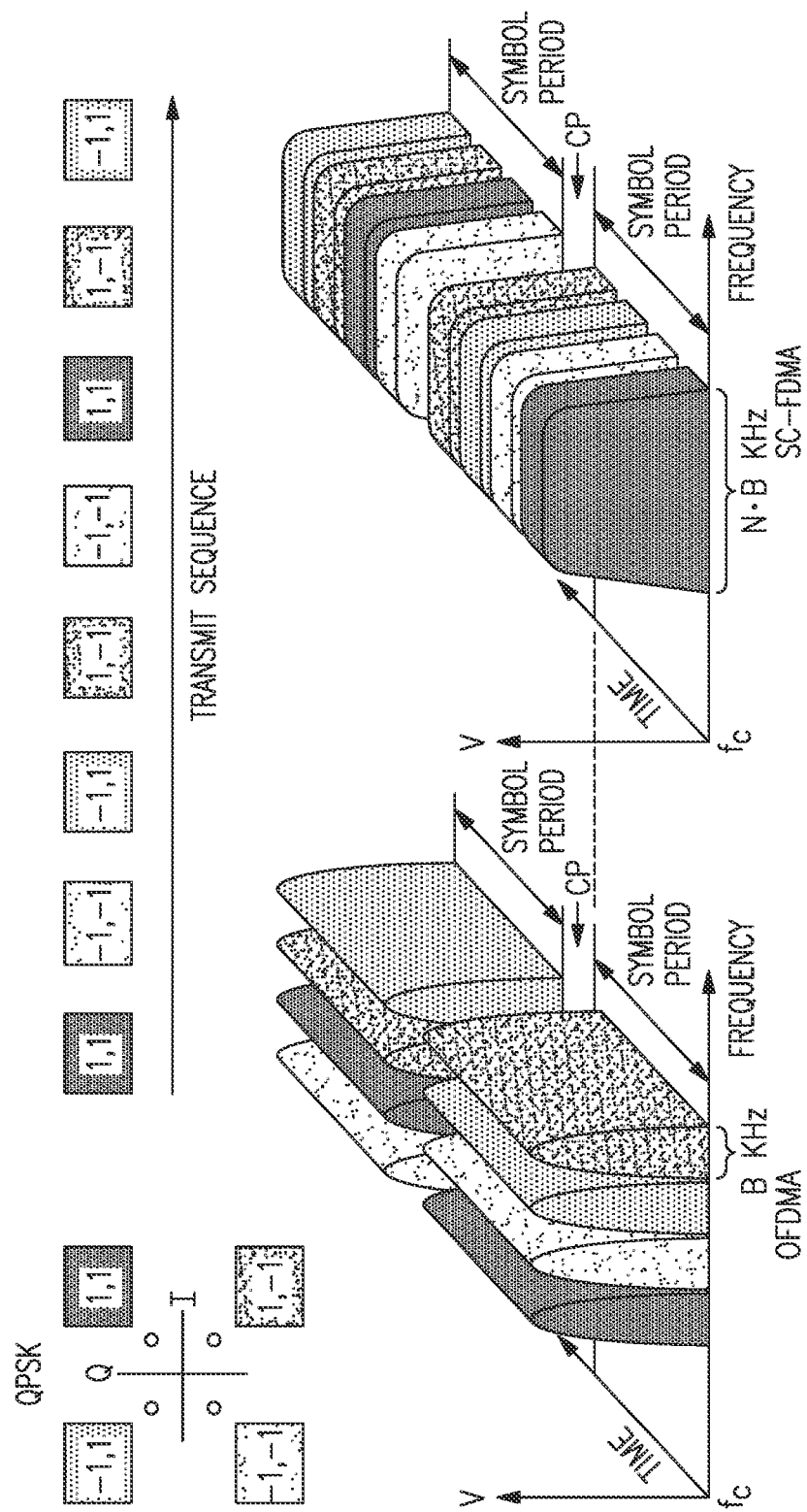
FIG. 4 is a schematic diagram illustrating two examples of multiple access schemes for a communication network.

FIG. 4 is a schematic diagram illustrating two examples of multiple access schemes for a communication network. Examples of frequency versus voltage versus time for OFDMA and SC-FDMA are depicted in FIG. 4.

The examples are shown for an illustrated transmit sequence of different QPSK modulating data symbols, in this embodiment. As shown in FIG. 4, SC-FDMA includes data symbols occupying greater bandwidth (N*B KHz, where N=4 in this example) relative to OFDMA data symbols (B KHz). However, the SC-FDMA data symbols occupy the greater bandwidth for a fraction of time (1/N) relative to that of the OFDMA data symbols. FIG. 4 has also been annotated to show times of transmitting a cyclic prefix (CP).

Figure 5A:
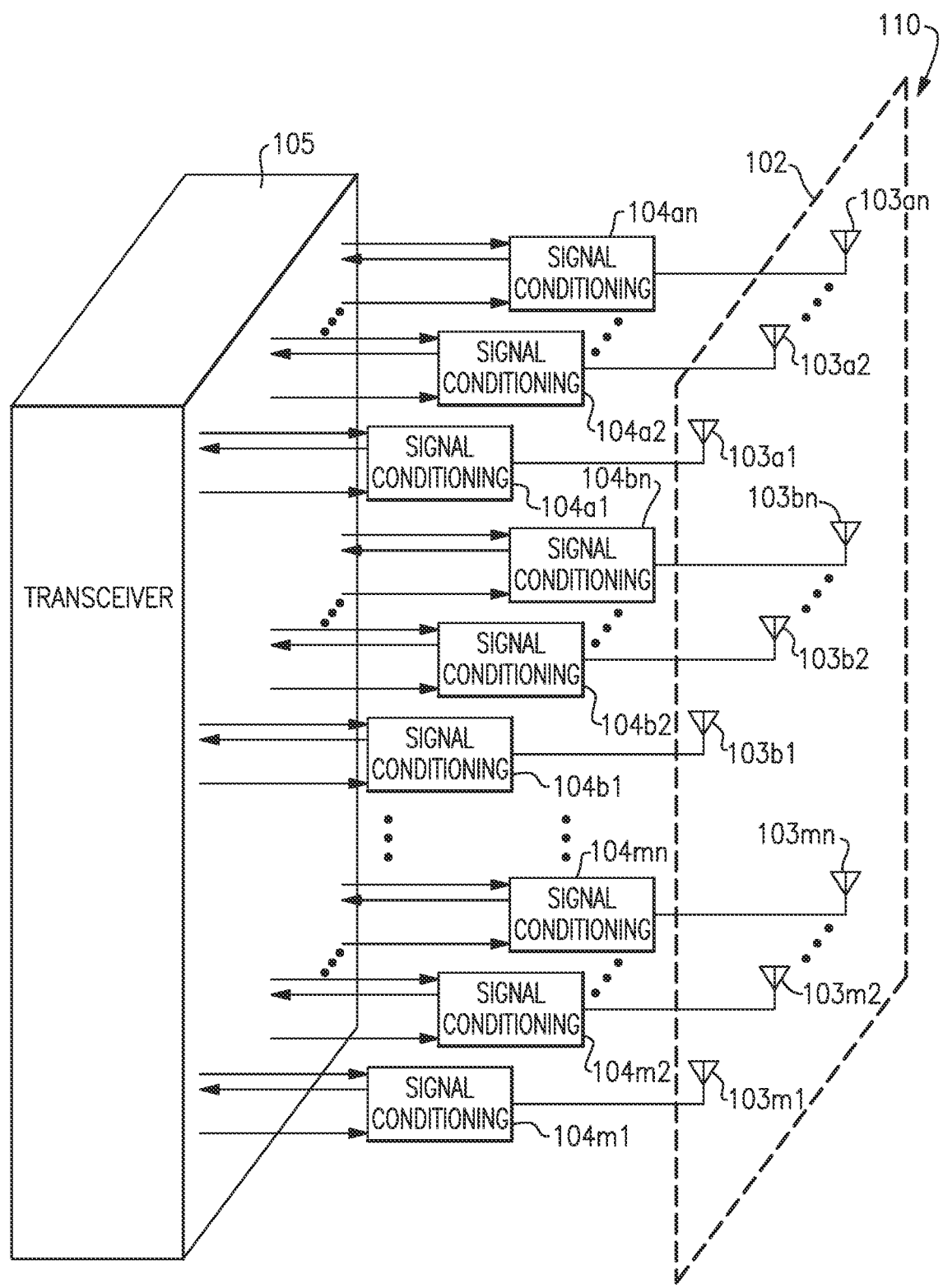
FIG. 5A is a schematic diagram of one example of a communication system that operates with beamforming.

FIG. 5A is a schematic diagram of one example of a communication system 110 that operates with beamforming. The communication system 110 includes a transceiver 105, signal conditioning circuits $104a1$, $104a2$ . . . $104an$, $104b1$, $104b2$ . . . $104bn$, $104m1$, $104m2$ . . . $104mn$, and an antenna array 102 that includes antenna elements $103a1$, $103a2$ . . . $103an$, $103b1$, $103b2$ . . . $103bn$, $103m1$, $103m2$ . . . $103mn$.

Communications systems that communicate using millimeter wave carriers (for instance, 30 GHz to 300 GHz), centimeter wave carriers (for instance, 3 GHZ to 30 GHZ), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 5A, the transceiver 105 generates control signals for the signal conditioning circuits. The control signals can be used for a variety of functions, such as controlling the gain and phase of transmitted and/or received signals to control beamforming.

Figure 5B:
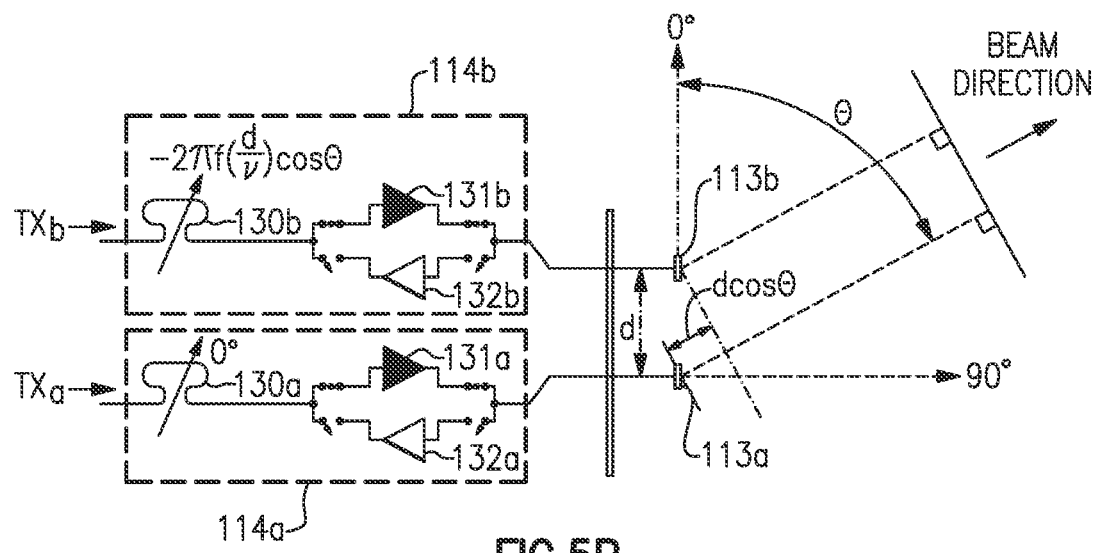
FIG. 5B is a schematic diagram of one example of beamforming to provide a transmit beam.

FIG. 5B is a schematic diagram of one example of beamforming to provide a transmit beam. FIG. 5B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 5B illustrates one embodiment of a portion of the communication system 110 of FIG. 5A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 5B has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle θ can be achieved. For example, when the first phase shifter 130a has a reference value of 0°, the second phase shifter 130b can be controlled to provide a phase shift of about $-2\pi f(d/v)\cos\theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130b can be controlled to provide a phase shift of about $-\pi\cos\theta$ radians to achieve a transmit beam angle θ.

Accordingly, the relative phase of the phase shifters 130a, 130b can be controlled to provide transmit beamforming. In certain implementations, a baseband processor and/or a transceiver (for example, the transceiver 105 of FIG. 5A) controls phase values of one or more phase shifters and gain values of one or more controllable amplifiers to control beamforming.

Figure 5C:
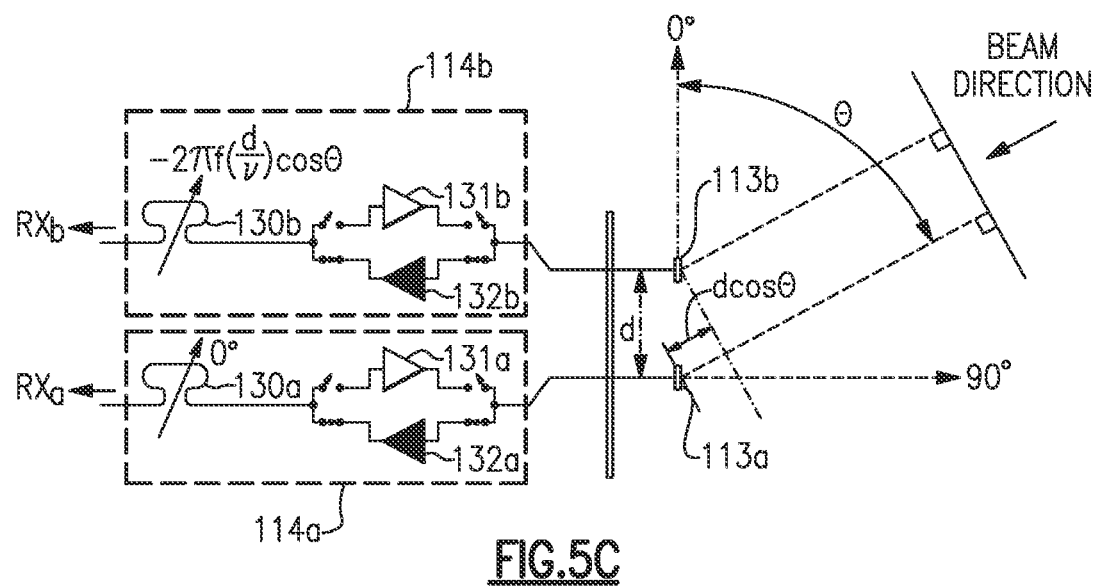
FIG. 5C is a schematic diagram of one example of beamforming to provide a receive beam.

FIG. 5C is a schematic diagram of one example of beamforming to provide a receive beam. FIG. 5C is similar to FIG. 5B, except that FIG. 5C illustrates beamforming in the context of a receive beam rather than a transmit beam.

As shown in FIG. 5C, a relative phase difference between the first phase shifter 130a and the second phase shifter 130b can be selected to about equal to $-2\pi f(d/v)\cos\theta$ radians to achieve a desired receive beam angle θ. In implementations in which the distance d corresponds to about ½λ, the phase difference can be selected to about equal to $-\pi\cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Sounding Reference Signal Switching

In cellular networks, such as 5G networks, sounding reference signal (SRS) features can be enabled to determine channel qualities of a communication link between UE and a base station. SRS symbols are transmitted on uplink and processed by the network to estimate the quality of the wireless channel at different frequencies. For instance, the SRS symbols transmitted by the UE can be used by the base station to estimate the quality of the uplink channel for large bandwidths outside the assigned frequency span to the UE.

Although SRS provides a number of benefits, SRS also places a burden on data transport capacity.

Under 3GPP 5G Release 15, ON to ON timing for consecutive SRS symbols is 15 microseconds (μs) for Frequency Range 1 (FR1). For a subcarrier spacing (SCS) of 15 kilohertz (kHz), the cyclic prefix (CP) and 10 μs of the preceding data symbol is consumed. At 30 kHz and 60 kHz SCS 15 μs the ON to ON timing constraint corresponds to about half a symbol and a full symbol, respectively. Thus, a full symbol can be lost or blanked when 30 kHz or 60 kHz SCS is enabled.

Apparatus and methods for SRS switching are provided. In certain embodiments, transmit path resources of UE are used to reduce or eliminate the impairment of SRS upon transport capacity. Furthermore, the transmit path resources can be used for other purposes, and thus SRS switching time can be reduced by re-using transmit path resources that may be included for other purposes. The teachings herein can be used to achieve SRS switching of 0 μs, thereby eliminating the impact of switching timing constraints for SRS symbols on transport capacity.

In certain implementations, the UE includes a first transmit path associated with a first power amplifier, and a second transmit path associated with a second power amplifier. Additionally, when the second transmit path is not in use for other purposes, symbol transmissions are staggered using the first transmit path and the second transmit path, with at least the second transmit path used for transmitting SRS symbols. Thus, a power amplifier associated with an antenna not in operation for data transport can be used for SRS signaling. Implementing SRS in this manner can provide a number of advantages, including, but not limited to, 0 μs SRS switching.

In certain implementations, the first transmit path and the second transmit path correspond to transmit paths used for transmitting MIMO signals. For example, in the context of a UE capable of UL MIMO and not in MIMO mode, the first power amplifier (PA1) is used for data transport activities while the second power amplifier (PA2) is engaged for SRS.

Thus, a UE capable of UL MIMO and not in MIMO mode alternates transmit path resources to provide SRS. By using the other power amplifier, SRS can be achieved without overhead on data transport.

Such low overhead provides a number of advantages, including, but not limited to, uRLLC. For example, 0 μs SRS switching can be realized to achieve lower latency and enhanced performance relative to an implementation in which time is set aside to permit SRS on a particular antenna by shortening or blanking a symbol.

FIG. 6A is a diagram depicting two examples of symbol blanking for time slots including SRS symbols.

Certain cellular networks are implemented with an uplink physical layer that includes multiple physical channels. In one example, a cellular network includes a Physical Uplink Shared Channel (PUSCH) and a Physical Uplink Control Channel (PUCCH). Additionally, the PUSCH is used for transmitting user traffic data, while PUCCH carriers Uplink Control Information (UCI) indicating channel quality and other parameters.

The diagram of FIG. 6A depicts an example of a first time slot in which a transmit sequence includes three initial PUSCH/PUCCH symbols transmitted on a first antenna, followed by a first SRS symbol on the first antenna, followed by a blank symbol, and followed by a second SRS symbol on a second antenna. The diagram of FIG. 6B depicts an example of a second time slot in which two PUSCH/PUCCH symbols, a first blank symbol, a first SRS symbol, a second blank symbol, and a second SRS symbol are transmitted using various antennas as indicated.

Table 1 below shows one example of SCS and symbol blanking versus numerology.

TABLE 1

| numerology | SCS [kHz] | Y [symbol] |
|---|---|---|
| 0 | 15 | 1 |
| 1 | 30 | 1 |
| 2 | 60 | 1 |
| 3 | 120 | 2 |

In this example, one symbol blanking is permitted for SCS of 30 kHz and SCS of 60 kHz. Additionally, two symbol blanking is permitted for SCS of 120 kHz.

FIG. 6B is a table depicting one example of symbol duration versus SCS. The table depicts symbol duration for half of a time slot.

As shown in FIG. 6B, 15 kHz SCS operates with a first OFDM symbol that is 16TS longer than each of the other symbols in the time slot. The table includes information for SCS of 15 kHz, 30 kHz, and 60 kHz. As shown in the table, symbol duration scales linearly with SCS.

Figures 6C, 6D:
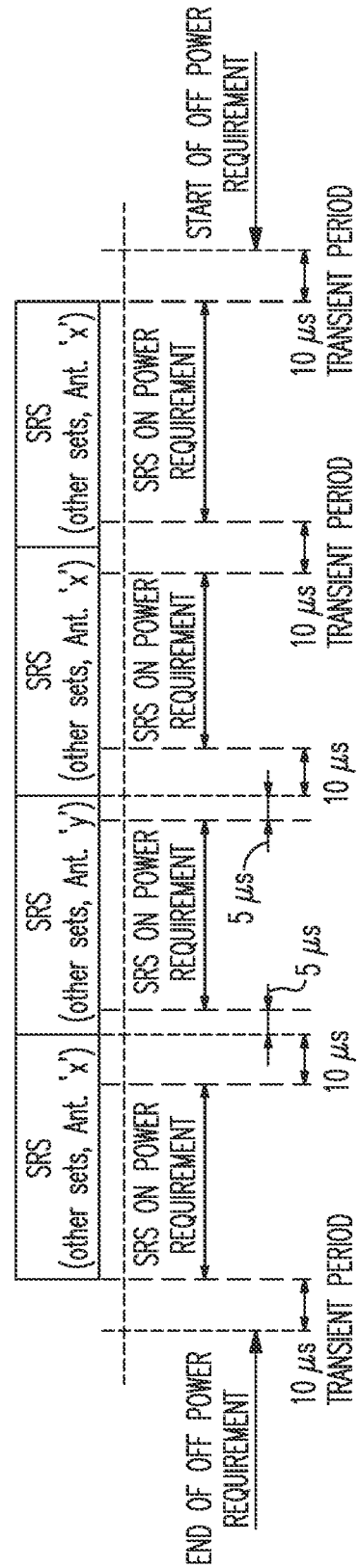
FIG. 6C is a table depicting one example of various communication parameters versus SCS.
FIG. 6D is a diagram of one example of ON to ON timing for SRS.

FIG. 6C is a table depicting one example of various communication parameters versus SCS.

In the example shown in FIG. 6C, CP scales linearly with SCS.

FIG. 6D is a diagram of one example of ON to ON timing for SRS.

As shown in FIG. 6D, SRS symbol used during switching (port 'y') is truncated by 5 μs+5 μs=10 μs. The first 5 μs CP duration at SCS of 15 kHz, while the second 5 μs arises from symbol impairment. Additionally, SRS symbols on prior and post switching transients suffer from 10 μs+5 μs=15 μs penalty.

Under 3GPP 5G Release 15, ON to ON timing for consecutive SRS symbols is 15 μs for FR1. For an SCS of 15 kHz, the CP is consumed and 10 μs of the preceding data symbol is consumed. At 30 kHz and 60 kHz SCS 15 μs of ON to ON timing corresponds to about half a symbol and a full symbol, respectively. Thus, a full symbol can be lost or blanked when 30 kHz or 60 kHz SCS is enabled.

In Release 15, symbol blanking is the default assumption for all UE types. Thus, uRLLC performance is degraded when scheduler applies SRS default symbol blanking to all UE types.

In certain implementations, the UE provides binary reporting of SRS switching latency. In one example, the binary reporting includes four states: 0 μs/less than 3 μs/less than 5 μs/less than 15 μs. In certain implementations, binary reporting is provided per frequency band.

Figure 7A:
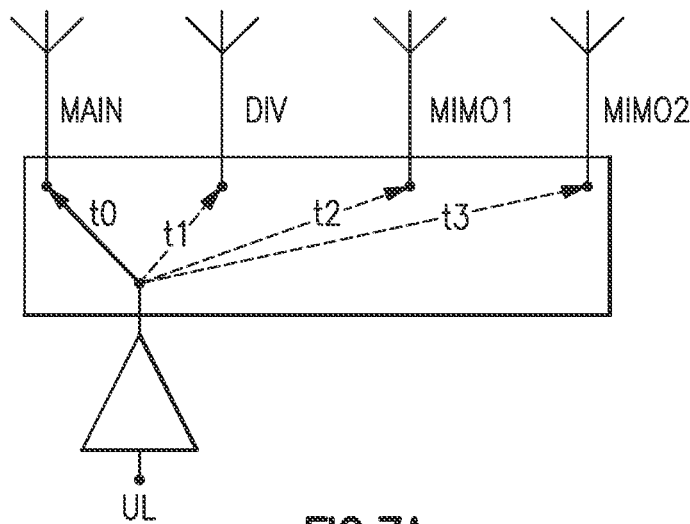
FIG. 7A is a schematic diagram of one example of a communication system operating with SRS for one transmit four receive (1T4R).
Figure 7B:
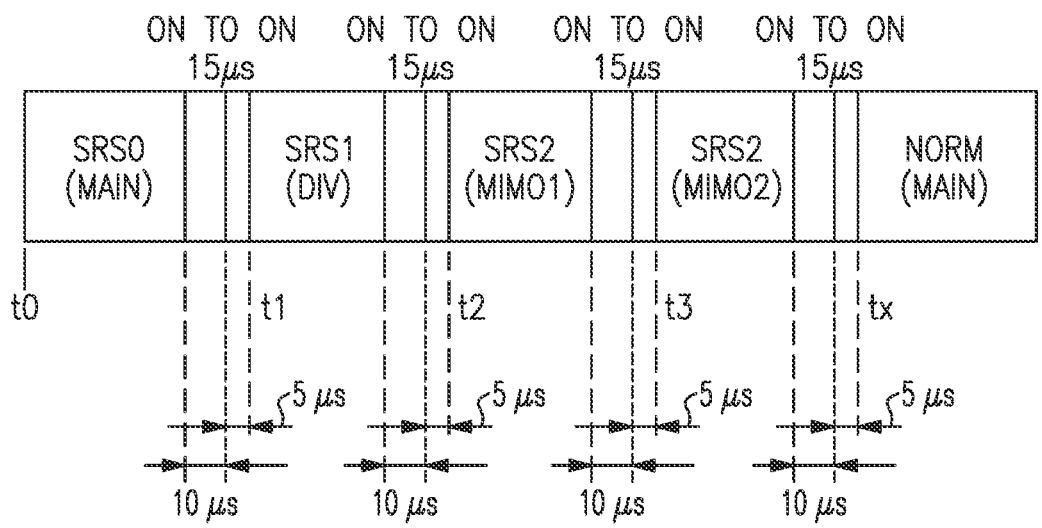
FIG. 7B is one example of a timing diagram for the communication system of FIG. 7A.

FIG. 7A is a schematic diagram of one example of a communication system operating with SRS for one transmit four receive (1T4R). FIG. 7B is one example of a timing diagram for the communication system of FIG. 7A.

With reference to FIGS. 7A and 7B, the communication system includes a power amplifier that is connected to a main antenna, a diversity antenna, a first MIMO antenna, and a second MIMO antenna by a multi-throw switch.

When sounding all four antennas at 15 kHz SCS, 4 symbols are used with whole CP and 10 μs of the preceding symbol affected. For 30 kHz and 60 kHz SCS, 7 symbols are used, 3 of which are blanks.

Figure 8A:
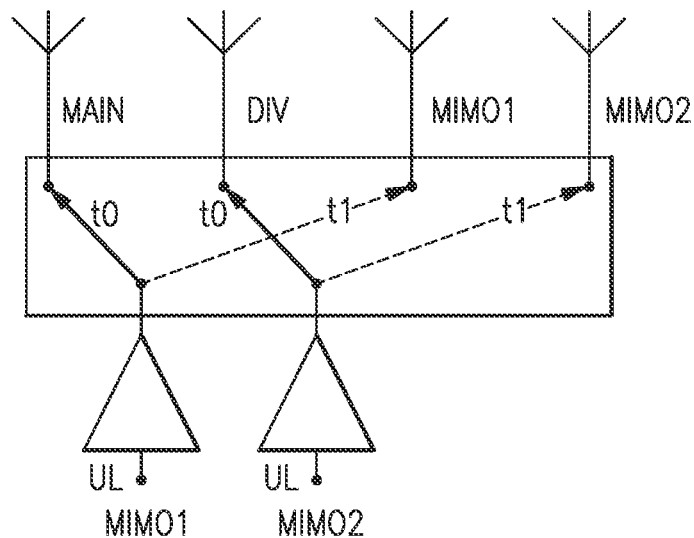
FIG. 8A is a schematic diagram of one example of a communication system operating with SRS for two transmit four receive (2T4R).
Figure 8B:
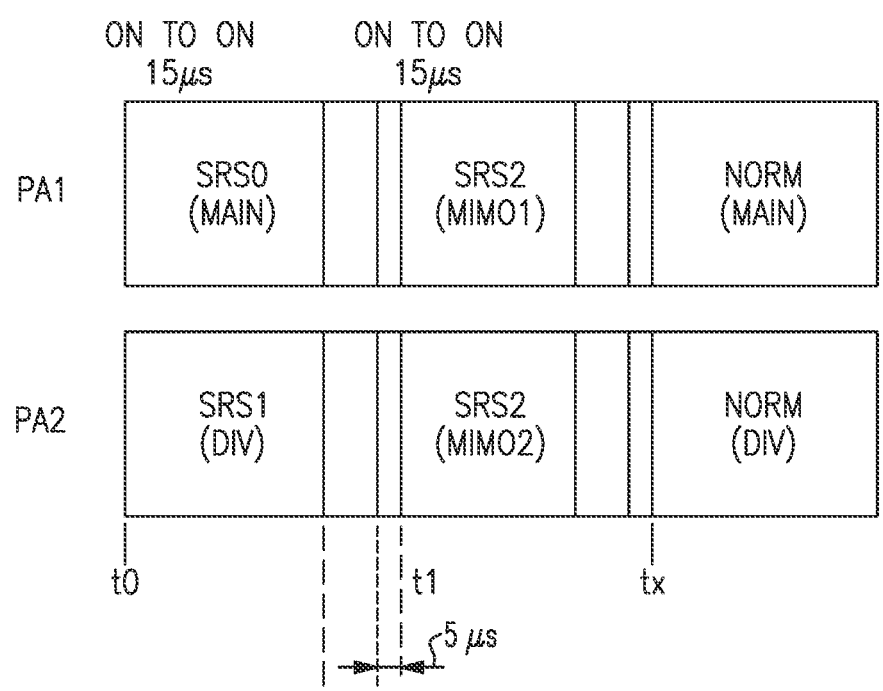
FIG. 8B is one example of a timing diagram for the communication system of FIG. 8A.

FIG. 8A is a schematic diagram of one example of a communication system operating with SRS for two transmit four receive (2T4R). FIG. 8B is one example of a timing diagram for the communication system of FIG. 8A.

With reference to FIGS. 8A and 8B, the communication system includes a first power amplifier that is connected to a main antenna and a first MIMO antenna by a first multi-throw switch. Additionally, the communication system further includes a second power amplifier that is connected to a diversity antenna and a second MIMO antenna by a second multi-throw switch.

When sounding all four antennas at 15 kHz SCS, 2 symbols are used with whole CP and 10 μs of preceding symbol affected. For 30 kHz and 60 kHz SCS, 4 symbols are used, 2 of which are blanks.

Sounding Reference Signal Switching for FDD

As discussed, SRS antenna hopping can be used to model the downlink channel and significantly improve SNR. For TDD paths between user equipment 905 and the base station 925, for example, a phone or other user equipment having multiple antennas can transmit known symbol_1 to the base station via a first antenna $ANT_1$, known symbol_2 via a second antenna $ANT_2$, and so on for each antenna. The base station receives the known symbols transmitted by each antenna, and because symbols are known to the base station and the transmit/uplink frequency is the same as the receive/downlink frequency for TDD, the base station can determine a good receive/downlink channel model for each antenna based on processing the received transmit/uplink symbol from that antenna.

In this fashion, after receiving the known SRS symbols from the antennas, when the base station transmits to the user equipment device over the downlink channel, it can optimize the downlink SNR specifically for each antenna/path and the base station now has accurate channel models and can improve the SNR on each channel significantly. In other words, the base station can determine processing to use to transmit the downlink signals based on the SRS symbols received from the uplink symbols on each antenna path, and because the base station knows more about the communication channels it can establish path coherence, including for multi-path communication. As a result, SRS switching can effectively improve the downlink data rates by about 40% throughput increase. This process can also improve the downlink receive diversity gains because of the SNR improvement.

In contrast to TDD communication, FDD communication involves transmitting and receiving at the same time but over different transmit/uplink and receive/downlink frequency sub-band ranges within an FDD band. According to certain embodiments described herein, user equipment devices are capable of both transmitting and receiving at the receive/downlink frequency range for a given FDD band. For example, mobile devices are disclosed herein configurable to configurable to support SRS hopping in FDD communication bands. Such devices can be capable of transmitting symbols to the base station for one or more FDD bands within the receive frequency range for that band.

Figure 9:
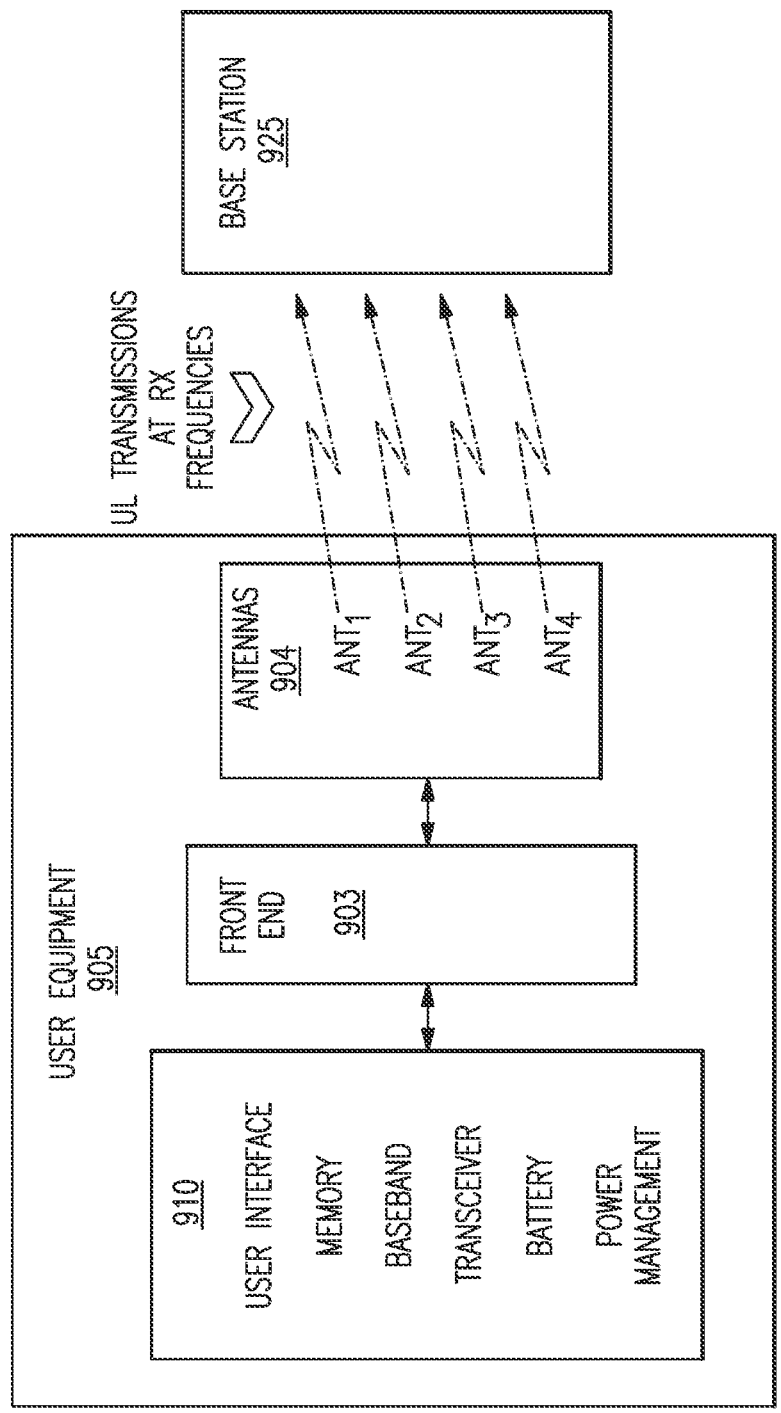
FIG. 9 is a diagram of one example of user equipment configurable for SRS hopping for FDD communication.

FIG. 9 is a diagram of one example of user equipment 905 (e.g., a cellphone or other mobile device) that is configured for SRS antenna port switching for FDD channels. The illustrated example user equipment 905 has four antennas 904 and is configured to provide uplink transmission to a base station 925 on each of the antennas within a receive frequency sub-band of an FDD band (e.g., a different FDD band for each antenna). The UE 905 can include circuits or other componentry 910 that implement user interface, memory, baseband, transceiver, battery, and power management functionality, which can be any of the user interface 807, memory 806, baseband processor 801, transceiver 802, battery 808, and power management 805 components shown and described with respect to FIG. 12, for example.

Figure 10:
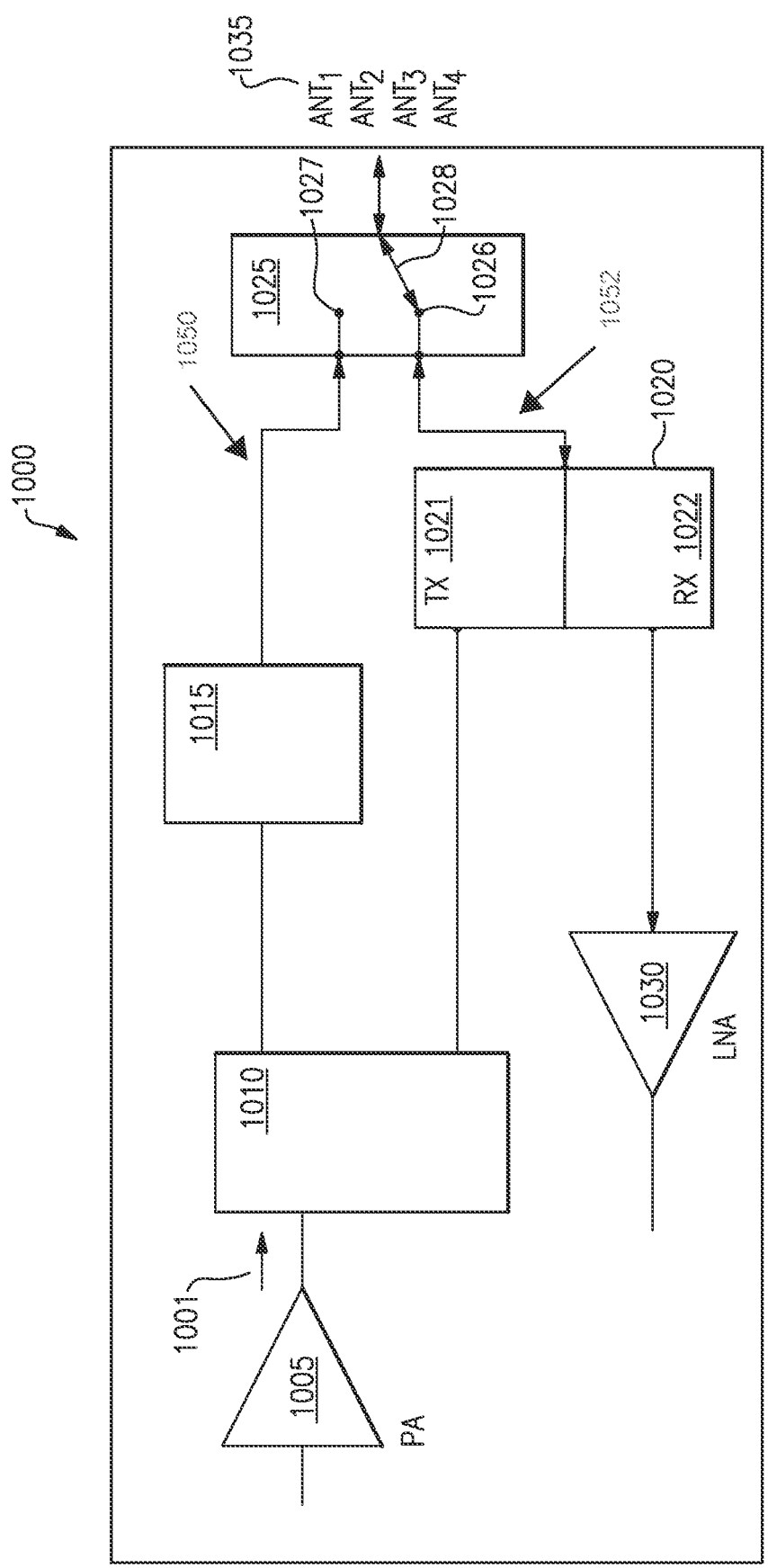
FIG. 10 is a schematic of one embodiment of a system configurable for SRS hopping for FDD communication.
Figure 11:
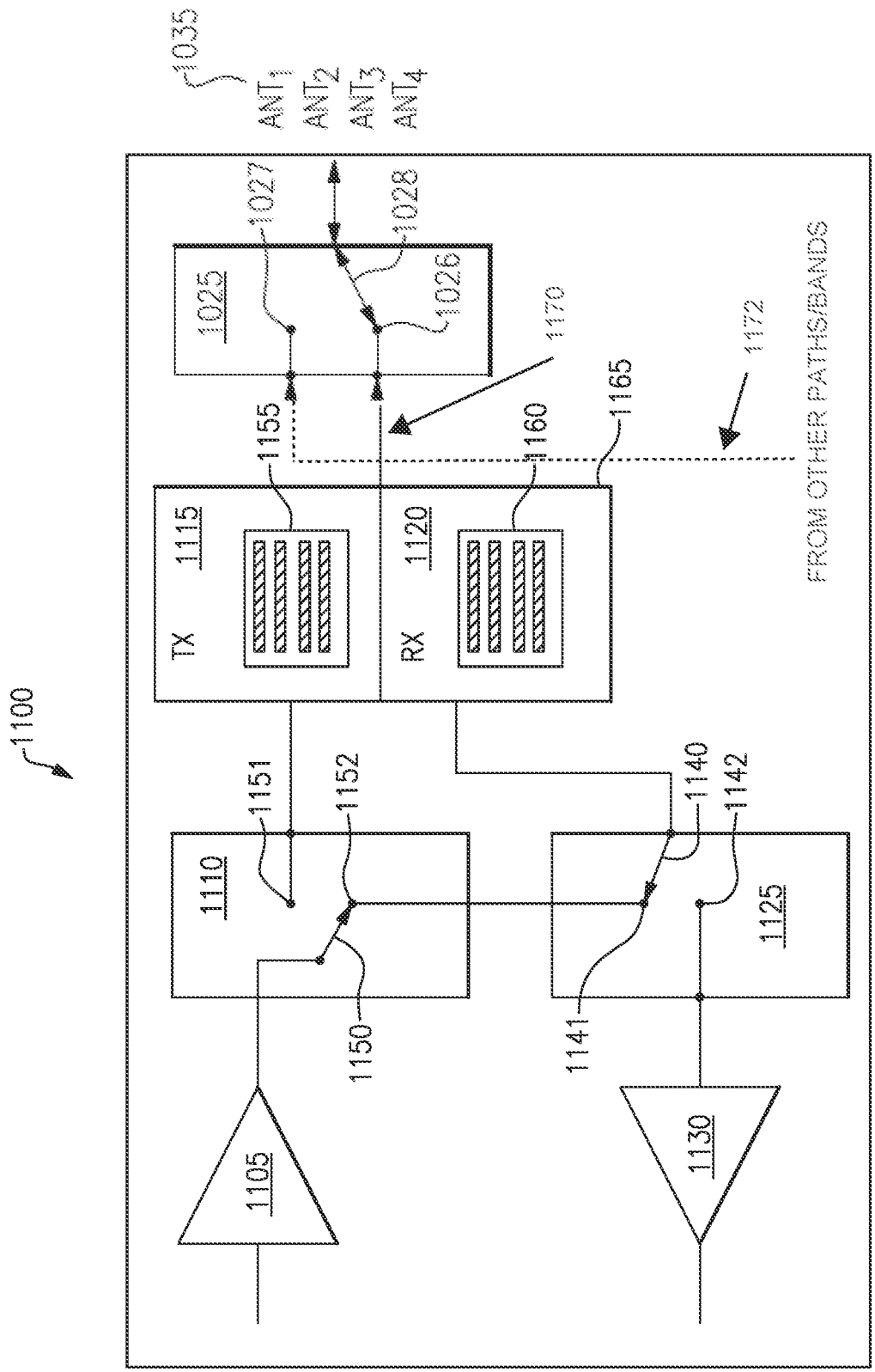
FIG. 11 is a schematic of another embodiment of a system configurable for SRS hopping for FDD communication.
Figure 12:
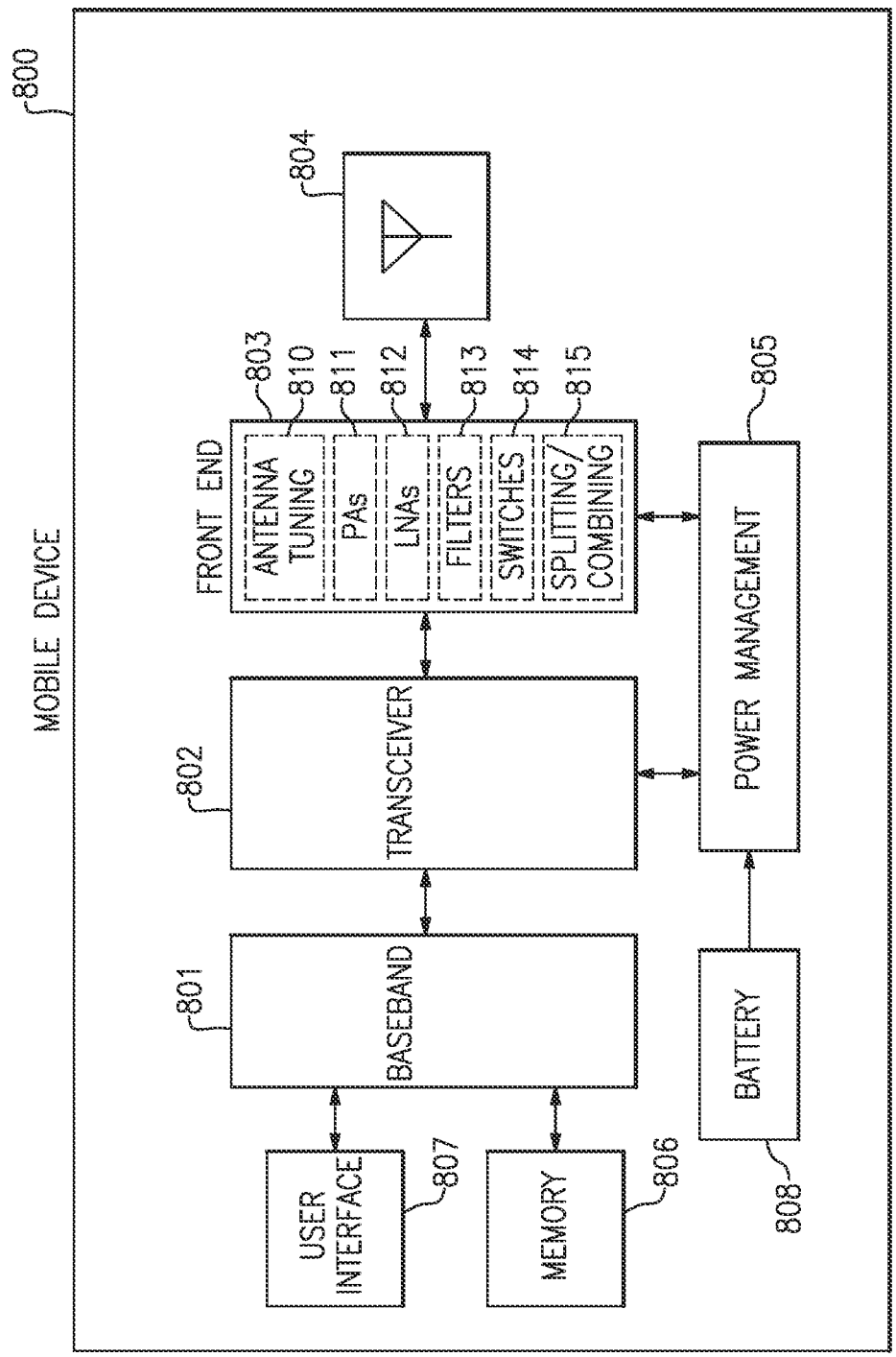
FIG. 12 is a schematic of a mobile device that can include the functionality illustrated in FIG. 9, for example, and which can include either of the systems illustrated in FIGS. 10 and 11.

The UE 905 also includes a front end 903 that aids in conditioning signals transmitted to and/or received from the antennas 904, and which can incorporate the front ends 1000, 1100, 803 of any of FIG. 10, 11, or 12, any of the other front ends described herein, or portions or combinations thereof. For example, the front-end 903 can include antenna tuning circuitry, power amplifiers (PAs), low noise amplifiers (LNAs), filters, switches, and signal splitting/combining circuitry, e.g., any of those described herein, such as with respect to FIG. 12. Some or all the componentry 910, the front end 903, and the antennas 904 can reside on a printed circuit board or other substrate such as a phone board. However, other implementations are possible. The user equipment 905 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies. The UE 905 can be implemented in accordance with any of the embodiments herein.

By allowing transmission (up-plink) within FDD receive (down-link) frequency band ranges, the user equipment 905 according to certain embodiments can provide improved channel modeling and SNR for FDD channels. As just one example, the UE 905 can be configured to: 1) for a first FDD band, transmit via ANT1 known symbols (e.g., SRS symbols) within the receive (downlink) frequency range of the FDD band from the user equipment 905 to the base station 925; 2) for a second FDD band, transmit via ANT2 known symbols (e.g., SRS symbols) within the receive (downlink) frequency range from the UE 905 to the base station 925; 1) for a third FDD band, transmit via ANT3 known symbols (e.g., SRS symbols) within the receive (downlink) frequency range from the UE 905 to the base station 925; and 4) for a fourth FDD band, transmit via ANT4 known symbols (e.g., SRS symbols) within the receive (downlink) frequency range from the UE 905 to the base station 925.

FIG. 10 is a schematic of one example of a system 1000 configured to both transmit (uplink) and receive (downlink) at the receive frequency range of one or more FDD bands, such as for SRS type antenna switching/hopping to improve channel modeling by a base station (not shown). The system 1000 can be a radio frequency front end system, for example, which can be incorporated into the front end 903 of the user equipment 905 of FIG. 9, or the front end 803 of FIG. 12.

As illustrated in FIG. 10, the example system 1000 includes a power amplifier 1005 coupled to a signal directing component (e.g., a switch) 1010. The example system 1000 includes a transmit filter 1015 coupled to the output of the switch 1010 configured for transmission within a first frequency band (e.g., an LTE TDD band). The system 1000 further includes an FDD filter 1020 (e.g., for an LTE FDD band) that includes a transmit filter portion 1021 configured to pass transmit signal content within an FDD transmit frequency range and a receive filter portion 1022 configured to pass receive signal content within an FDD receive frequency range.

The system 1000 further includes a low noise amplifier 1030 coupled to the output of the receive portion 1022 of the FDD filter 1020 to amplify receive (downlink) content filtered by the receive portion 1022 of the FDD filter 1020. The system 1000 further includes an antenna switching component 1025 coupled to a TX Out/RX In port of the FDD filter 1020 and to the output of the transmit filter 1015. As shown, the antenna switching component 1025 can include at least one switch 1028 configured to selectively connect the first path 1050 to one of the antennas 1035 and to selectively connect the second path 1052 to one of the antennas 1035. As shown, in one embodiment, the antennas 1035 can include four antennas $ANT_1$-$ANT_4$.

In one implementation, the transmit filter 1015 is configured to transmit signal content within LTE TDD band 41 of signal content from 2496-2690 MHz, and the FDD filter 1020 is an LTE FDD band 7 filter, where the receive filter portion 1022 is configured to pass receive (downlink) signal content from 2620-2690 MHz and transmit (uplink) signal content from 2500-2570 MHz. Thus, in this and other configurations involving other combinations of TDD/FDD bands, the transmit filter 1015 can have a passband that encompasses and/or is wider than the transmit sub-band of the FDD band for which the FDD filter 1020 is designed.

In the example implementation, because the LTE FDD band 7 transmit frequency range is subsumed within LTE TDD band 41, the system 1000 can be controllable (e.g., by a baseband processor or other processor, not shown) to enter a first mode (e.g., an SRS mode) in which FDD band 7 transmit signal content is delivered over the first path 1050. In the first mode, the processor controls the system 1000 such that: 1) the switch 1010 couples the output of the power amplifier 1005 to the input of the TDD band 41 transmit filter 1015; 2) the antenna switching component 1025 couples the port 1027 (and therefore the output of the TDD band 41 transmit filter 1015) to one of the antennas 1035; 3) the baseband processor generates a sequence of known symbols (e.g., SRS symbols) within the FDD band 7 transmit (uplink) frequency range; 4) the symbols are transmitted via path 1050 and selected antenna 1035 to the base station; and 5) the base station receives and processes the received symbols to model the FDD band 7 receive (downlink)

channel of the system 1000, thereby improving SNR when sending downlink signal content to user equipment incorporating the system 1000 via the selected antenna 1035. The system can also be configured to repeat steps 1)-5) on some or all of the remaining antennas 1035 to model the downlink channel on an antenna-by-antenna basis.

After modeling the channel using the first mode of operation, the system 1000 can be controllable in a second mode to transmit FDD band 7 uplink signal content and receive FDD band 7 downlink signal content via the second channel 1052. In the second mode, processor controls the system 1000 such that: 1) the switch 1010 couples the output of the power amplifier 1005 to the input of the transmit filter portion 1021 of the FDD filter 1020; 2) the antenna switching component 1025 couples the port 1026 (and therefore the TX Out/Rx In port of the FDD filter 1020) to one of the antennas 1035; 3) the baseband processor transmits FDD band 7 receive (downlink) signal content for delivery to the selected antenna 1035, which is received via path 1052; 4) the baseband processor generates FDD band 7 transmit (uplink) signal content for transmission to the base station via path 1052 and the selected antenna 1035.

The system 1000 can be controllable in a third mode corresponding to a TDD band 41 communication mode, to transmit signal content over TDD band 41 via the first channel 1050. In the third mode, processor controls the system 1000 such that: 1) the switch 1010 couples the output of the power amplifier 1005 to the input of the TDD band 41 transmit filter 1015; 2) the antenna switching component 1025 couples the port 1027 (and therefore the output of the TDD band 41 transmit filter 1015) to one of the antennas 1035; 3) the baseband processor generates TDD band 41 transmit (uplink) signal content for transmission; 4) the signal content is transmitted via the base station via path 1050 and selected antenna 1035.

FIG. 11 illustrates another example of a system 1100 that can be implemented in user equipment, and which is also capable of SRS antenna port switching for FDD bands. The system 1100 includes a transmit power amplifier 1105, a low noise amplifier 1130, a first switch 1110, a second switch 1125, a duplexer 1165 including a transmit filter portion 1115 and a receive filter portion 1120, an antenna switch 1025, and a set of antennas 1035. The system 1100 can be connected to a selected one of the antennas 1135 via the antenna switching circuit 1025.

In one embodiment the duplexer 1165 is an LTE FDD band 7 filter, where the receive filter side 1020 is configured to pass signal content from 2620-2690 MHz and the transmit filter side 1115 is configured to pass signal content from 2500-2570 MHZ.

According to certain embodiments, during a normal FDD operation mode, the baseband processor or other appropriate control device (not shown), controls the switching element 1150 of the switch 1110 to connect to the terminal 1151, thereby connecting the output of the power amplifier 1105 to the transmitter filter side 1115 of the duplexer 1165. This establishes a communication path that is used for standard FDD transmit (uplink) communication over the FDD transmit frequency range of an FDD band (e.g., LTE FDD band 7), between the selected antenna 1035 and a base station. During standard FDD operation, the processor can also control the switching element 1140 of the switch 1125 to connect to the terminal 1142, thereby connecting the receive filter side 1120 of the duplexer 1165 to the input of low noise amplifier 1130. This establishes a communication path between the selected antenna 1035 and the low noise amplifier 1130 for standard FDD receive (downlink) communication over the FDD receive frequency range of the FDD band, between the selected antenna 1035 and the base station.

The system 1100 can also be configured in an SRS mode for establishing an accurate channel model, e.g., of the FDD receive (downlink) channel. In the SRS mode, the processor controls the switching element 1150 of the switch 1110 to connect to the terminal 1152 and controls the switching element 1140 of the switch 1125 to connect to the terminal 1141, thereby creating a transmit communication path between the power amplifier 1105 and the receive filter side 1120 of the duplexer 1165. This enables transmission (uplink) through the FDD receive filter 1120 within the frequency range FDD receive sub-band. The receive filter side 1120 of the duplexer 1165 can be sized and otherwise selected to sufficiently to handle transmit signal powers during SRS mode operation. Such an implementation allows the base station to receive a symbol transmitted through the FDD receive path and use it to calibrate the receive signals, as discussed herein. The system 1100 can additionally be configurable to repeat the SRS mode on some or all of the remaining antennas 1035, to model the downlink channel on an antenna-by-antenna basis.

When a smart phone or other mobile device that incorporates FDD SRS hopping capability (e.g., that of the system 1000 of FIG. 10 or of the system 1100 of FIG. 11) transmits SRS symbols at an FDD receive (downlink) frequency, there can be a risk that other mobile devices that are currently receiving at the FDD receive (downlink) frequency become victims of the SRS transmissions because the SRS transmission is at the same frequency as the FDD receive (downlink) for that FDD band. In this fashion, the device transmitting the SRS symbols may falsely appear as a base station to other user equipment currently receiving FDD downlink content in that band. According to certain embodiments, the base station is generally aware of the network of mobile devices in its coverage area and is configured to prevent such interference by implementing a smart scheduling technique to de-conflict any devices in SRS transmission mode with devices in FDD receive (downlink) mode. For example, according to one embodiment, the base station only allows SRS transmission on an FDD receive sub-band during time slots when other mobile devices in the area are not receiving on that FDD sub-band.

While not illustrated in FIGS. 10 and 11 for the sake of simplicity, the systems 1000, 1100 can include additional componentry to allow for FDD SRS operation in additional FDD bands using additional combinations of TDD/FDD pathways/channels, which can each include similar combinations of power amplifiers, switches, low noise amplifiers, and filters.

FIG. 12 is a schematic diagram of one embodiment of a mobile device 800. The mobile device 800 includes a baseband system 801, a transceiver 802, a front-end system 803, antennas 804, a power management system 805, a memory 806, a user interface 807, and a battery 808. The mobile device illustrated in FIG. 12 can include the functionality illustrated in FIG. 9, for example, that can include the circuit illustrated in FIGS. 10 and 11. For example, the front-end system 803 can include the SRS antenna port switching for FDD functionality implemented in circuits 1000 (FIG. 10) or circuit 1100 (FIG. 11). The mobile device 800 can be implemented in accordance with any of the embodiments herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 12 as the transceiver 802. In one example, separate components (for instance, separate circuits or dies) can be provided for handling certain types of RF signals.

The front-end system 803 aids in conditioning signals transmitted to and/or received from the antennas 804. In the illustrated embodiment, the front-end system 803 includes antenna tuning circuitry 810, power amplifiers (PAS) 811, low noise amplifiers (LNAs) 812, filters 813, switches 814, and signal splitting/combining circuitry 815. However, other implementations are possible.

For example, the front-end system 803 can provide a number of functionalities, including, but not limited to, amplifying signals for transmission, amplifying received signals, filtering signals, switching between different bands, switching between different power modes, switching between transmission, and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD) and may be used to aggregate a plurality of carriers or channels. Carrier aggregation includes contiguous aggregation, in which contiguous carriers within the same operating frequency band are aggregated. Carrier aggregation can also be non-contiguous and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 12, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 12, the power management system 805 receives a battery voltage from the battery 808. The battery 808 can be any suitable battery for use in the mobile device 800, including, for example, a lithium-ion battery.

Applications

Some of the embodiments described above have provided examples in connection with mobile devices. However, the principles and advantages of the embodiments can be used for a wide range of RF communication systems. Examples of such RF communication systems include, but are not limited to, mobile phones, tablets, base stations, network access points, customer-premises equipment (CPE), laptops, and wearable electronics.

Implementation

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
a first antenna and a second antenna;
front end circuitry including a transmit amplifier, a transmit path including a first filter configured to pass an uplink sub-band of a frequency division duplex band, a time division duplex path including a second filter configured to pass a time division duplex band that encompasses at least a portion of the frequency division duplex band, and a receive path including a third filter configured to pass a downlink sub-band of the frequency division duplex band, the front end circuitry configurable in a frequency division duplex mode to transmit via the transmit path within the uplink sub-band and to receive via the receive path within the downlink sub-band, the front end circuitry further configurable in a sounding reference signal mode to 1) transmit one or more sounding reference signal symbols via the time division duplex path over the first antenna, and 2) to transmit one or more sounding reference signal symbols via the time division duplex path over the second antenna, transmission of the one or more sounding reference signal symbols enabling downlink frequency division duplex channel modeling on an antenna-by-antenna basis using the time division duplex path; and
a radio frequency switch configured to selectively connect the time division duplex path to either the first antenna or to the second antenna.

2. The mobile device of claim 1 further comprising a baseband processor, wherein in the sounding reference signal mode the baseband processor generates a first sequence of sounding reference signal symbols for transmission via the time division duplex path.

3. The mobile device of claim 1 wherein the first filter is a transmit portion of a frequency division duplex filter and the third filter is a receive portion of the frequency division duplex filter.

4. The mobile device of claim 3 wherein the time division duplex band is Long-Term Evolution band 41.

5. The mobile device of claim 4 wherein the frequency division duplex band is Long-Term Evolution band 7.

6. The mobile device of claim 4 wherein the radio frequency switch is further configured to switch between connecting an output of the frequency division duplex filter to an antenna of the mobile device and connecting the output of the second filter to the antenna.

7. The mobile device of claim 4 wherein the front end circuitry further includes a switch configured to selectively couple an output of the transmit amplifier to either the frequency division duplex filter or to the second filter.

8. The mobile device of claim 1 wherein the time division duplex band encompasses an entirety of the frequency division duplex band.

9. The mobile device of claim 8 wherein the frequency division duplex band is Long-Term Evolution band 30 and the time division duplex band is Long-Term Evolution band 40.

10. A radio frequency module comprising:
a substrate;
a transmit amplifier supported by the substrate; and
a first transmit path including a first filter configured to pass an uplink sub-band of a frequency division duplex band, a time division duplex path including a second filter configured to pass a time division duplex band that encompasses at least a portion of the frequency division duplex band, and a receive path including a third filter configured to pass a downlink sub-band of the frequency division duplex band, the radio frequency module configurable in a frequency division duplex mode to transmit, via the first transmit path, within the uplink sub-band, and to receive, via the receive path, within the downlink sub-band, the radio frequency module further configurable in a sounding reference signal mode 1) to transmit, via the time division duplex path, one or more sounding reference signal symbols over a first antenna within the frequency division duplex band, and 2) to transmit, via the time division duplex path, one or more sounding reference signal symbols over a second antenna within the frequency division duplex band, transmission of the one or more sounding reference signal symbols enabling downlink channel modeling on an antenna-by-antenna basis using the time division duplex path.

11. The radio frequency module of claim 10 further comprising an antenna switch, the radio frequency module further configurable in the sounding reference signal mode to control the antenna switch to selectively connect the time division duplex path to either of the first antenna or the second antenna.

12. The radio frequency module of claim 10 wherein in the sounding reference signal mode the time division duplex path transmits a first sequence of sounding reference signal symbols for transmission.

13. The radio frequency module of claim 10 wherein the first filter is a transmit portion of a frequency division duplex filter and the third filter is a receive portion of the frequency division duplex filter.

14. The radio frequency module of claim 10 wherein the time division duplex band is Long-Term Evolution band 41.

15. The radio frequency module of claim 14 wherein the frequency division duplex band is Long-Term Evolution band 7 and the time division duplex band is Long-Term Evolution band 41.

16. The radio frequency module of claim 14 wherein the frequency division duplex band is Long-Term Evolution band 30 and the time division duplex band is Long-Term Evolution band 40.

17. A method of operating a mobile device, comprising:
when the mobile device is in a frequency division duplex operating mode, transmitting within an uplink sub-band of a frequency division duplex band, with a first transmit path of the mobile device that includes a first filter configured to pass the uplink sub-band, and receiving within a downlink sub-band of the frequency division duplex band, via a receive path of the mobile device that includes a second filter configured to pass the downlink sub-band;
when the mobile device is in a sounding reference signal operating mode, transmitting, via a time division duplex path of the mobile device that includes a third filter configured to pass a time division duplex band that encompasses at least a portion of the frequency division duplex band, one or more first sounding reference signal symbols via the time division duplex path over a first antenna of the mobile device; and
when the mobile device is in the sounding reference signal operating mode, subsequent to transmitting the one or more first sounding reference signal symbols, transmitting one or more second sounding reference signal symbols via the time division duplex path via a second antenna of the mobile device, transmission of the one or more first and second sounding reference signal symbols enabling downlink channel modeling on an antenna-by-antenna basis, transmission of the one or more first sounding reference signal symbols and the one or more second sounding reference signal symbols enabling downlink frequency division duplex channel modeling on an antenna-by-antenna basis using the time division duplex path.

18. The method of claim 17 wherein the first transmit path extends between a transmit power amplifier of the mobile device and an antenna of the mobile device and the time division duplex path extends between the transmit power amplifier of the mobile device and the antenna of the mobile device via a different connection pathway.

19. The method of claim 17 wherein the time division duplex band encompasses an entirety of the frequency division duplex band.

* * * * *